United States Patent
Kuskin et al.

(10) Patent No.: US 6,940,865 B2
(45) Date of Patent: Sep. 6, 2005

(54) SYSTEM AND METHOD FOR INTERLEAVING FRAMES WITH DIFFERENT PRIORITIES

(75) Inventors: Jeffrey Scott Kuskin, Mountain View, CA (US); Tao-Fei Samuel Ng, Fremont, CA (US); Andrew M. Davidson, San Jose, CA (US)

(73) Assignee: Atheros Communications, Inc., Sunnyvale, CA (US)

(*) Notice: Subject to any disclaimer, the term of this patent is extended or adjusted under 35 U.S.C. 154(b) by 902 days.

(21) Appl. No.: 09/925,978

(22) Filed: Aug. 9, 2001

(65) Prior Publication Data

US 2003/0033422 A1 Feb. 13, 2003

Related U.S. Application Data

(60) Provisional application No. 60/325,782, filed on Apr. 17, 2001.

(51) Int. Cl.[7] .............................................. H04L 12/28
(52) U.S. Cl. ..................................... 370/412; 709/232
(58) Field of Search ................................ 370/230, 231, 370/235, 338, 412, 415, 420, 428, 463, 913, 238; 709/241; 710/29, 39, 40, 52, 244

(56) References Cited

U.S. PATENT DOCUMENTS

| | | | |
|---|---|---|---|
| 4,956,771 A | | 9/1990 | Neustaedter ................ 364/200 |
| 5,633,865 A | * | 5/1997 | Short ........................... 370/412 |
| 5,701,495 A | | 12/1997 | Arndt et al. ................. 395/736 |
| 5,948,081 A | | 9/1999 | Foster ............................ 710/40 |
| 5,953,335 A | * | 9/1999 | Erimli et al. ................ 370/390 |
| 5,978,770 A | | 11/1999 | Waytena et al. ................ 705/5 |
| 6,011,799 A | * | 1/2000 | Kerstein et al. ............. 370/422 |
| 6,134,634 A | | 10/2000 | Marshall, Jr. et al. ...... 711/143 |
| 6,157,963 A | | 12/2000 | Courtright, II et al. ......... 710/5 |
| 6,192,028 B1 | * | 2/2001 | Simmons et al. ............ 370/229 |
| 6,378,036 B2 | | 4/2002 | Lerman et al. .............. 711/112 |
| 6,401,147 B1 | | 6/2002 | Sang et al. ..................... 710/56 |

OTHER PUBLICATIONS

Do et al, A Scalable Priority Queue Manager Architecture for Output–Buffered ATM Switches, http://citeseer.ist.psu.edu/205814.html, pp. 1–7, 1999.*

* cited by examiner

*Primary Examiner*—Frank Duong
(74) *Attorney, Agent, or Firm*—Pillsbury Winthrop Shaw Pittman LLP

(57) ABSTRACT

A method of queue management includes: adding entries having a first priority to a first software queue; adding entries having a second priority to a second software queue; reading entries from the first software queue to a physical queue; at a threshold time, flushing entries from the physical queue; after the act of flushing the physical queue, reading entries from the second software queue to the physical queue until a termination criterion is satisfied; after the termination criterion is satisfied, reading entries from the first software queue to the physical queue; and transmitting entries from the physical queue to a network.

40 Claims, 4 Drawing Sheets

SYSTEM AND METHOD FOR INTERLEAVING FRAMES WITH DIFFERENT PRIORITIES

This application claims the benefit of provisional application Ser. No. 60/325,782 filed Apr. 17, 2001.

BACKGROUND OF THE INVENTION

1. Field of Invention

The present invention relates to data transfer in a network and more particularly to data transfer that interleaves frames with different priorities.

2. Description of Related Art

Typically different types of data with varying priorities must be transmitted within a network. Some data must be moved as quickly as possible subject to constraints associated with time-sensitive data that must be sent at fixed intervals. Under these circumstances, regular transmissions must be interrupted to accommodate the data that must be sent at fixed time intervals.

Although multiple queues can be used for multiple data priorities, additional queue management issues result from employing a multiplicity of queues, particularly when queues are implemented in hardware. These issues can be particularly troublesome in the context of a wireless network.

SUMMARY OF THE INVENTION

Accordingly, it is an object of this invention to provide a system and method for interleaving frames with different priorities for transmission in a network.

It is a further object to combine multiple software queues with a single hardware (or physical) queue.

The above and related objects of the present invention, taken alone or in combination, are realized by a system and method that combine software queues corresponding to different priorities with a single hardware queue for transmission in a network. Transmissions to the hardware queue from the software queues are managed to effect transmission priorities. Transmissions to the network are made from the single hardware queue.

According to a preferred embodiment of the present invention, a method of queue management includes: adding entries having a first priority to a first software queue; adding entries having a second priority to a second software queue; reading entries from the first software queue to a physical queue; at a threshold time, flushing entries from the physical queue; after the act of flushing the physical queue, reading entries from the second software queue to the physical queue until a termination criterion is satisfied; after the termination criterion is satisfied, reading entries from the first software queue to the physical queue; and transmitting entries from the physical queue to a network.

Typically the entries include frame data. Preferably, the method includes monitoring a timer to determine the threshold time.

The method can incorporate the use of head pointers to manage data traffic to and from the queues. Preferably, the method includes using a first head pointer in hardware to track a next entry of the first software queue to be read to the physical queue and using a second head pointer in hardware to track a next entry of the second software queue to be read to the physical queue. The first and second head pointers respectively include an address in the first software queue and an address in the second software queue. Then the act of flushing the physical queue can include backing up the first head pointer and the second head pointer.

The method also can include using a head pointer in hardware to track a next entry of the physical queue for transmission to the network, and using a head pointer in hardware to track a next available entry of the physical queue for reading entries from the first software queue and the second software queue.

The act of flushing the physical queue can include using backup buffers in hardware corresponding to the different priorities. Then, for entries in the physical queue having the first priority, the method includes storing addresses from the first software queue in a first backup buffer, and, for entries in the physical queue having the second priority, the method includes storing addresses from the second software queue in a second backup buffer. Then, the act of reading entries from the second software queue to the physical queue includes reading addresses in the second backup queue to access entries of the second software queue, and the act of reading entries from the first software queue to the physical queue after the termination criterion is satisfied includes reading addresses in the first backup queue to access entries of the first software queue.

In a specifically preferred embodiment, the termination criterion is satisfied when all active entries of the second software queue have been read to the physical queue. The method further can include using status indicators for entries in the first software queue and the second software queue, an active status indicating that a corresponding entry is waiting to be transmitted to the network, and an inactive status indicating that a corresponding entry is not waiting to be transmitted to the network. Then the method can include switching a status indicator from active status to inactive status after transmitting a corresponding entry to the network. Additionally, the act of adding entries to the first software queue can include switching corresponding status indicators from inactive status to active status, and the act of adding entries to the second software queue can include switching corresponding status indicators from inactive status to active status. Then in a typical operational setting the termination criterion is satisfied when all entries of the second software queue have an inactive status.

The network can be a wireless network. For hardware components related to data transmission in a wireless network, the present invention advantageously enables a single transmit queue and one instance of transmit logic for all types of data.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, where.

DETAILED DESCRIPTION OF EXEMPLARY EMBODIMENTS

Figure 1:
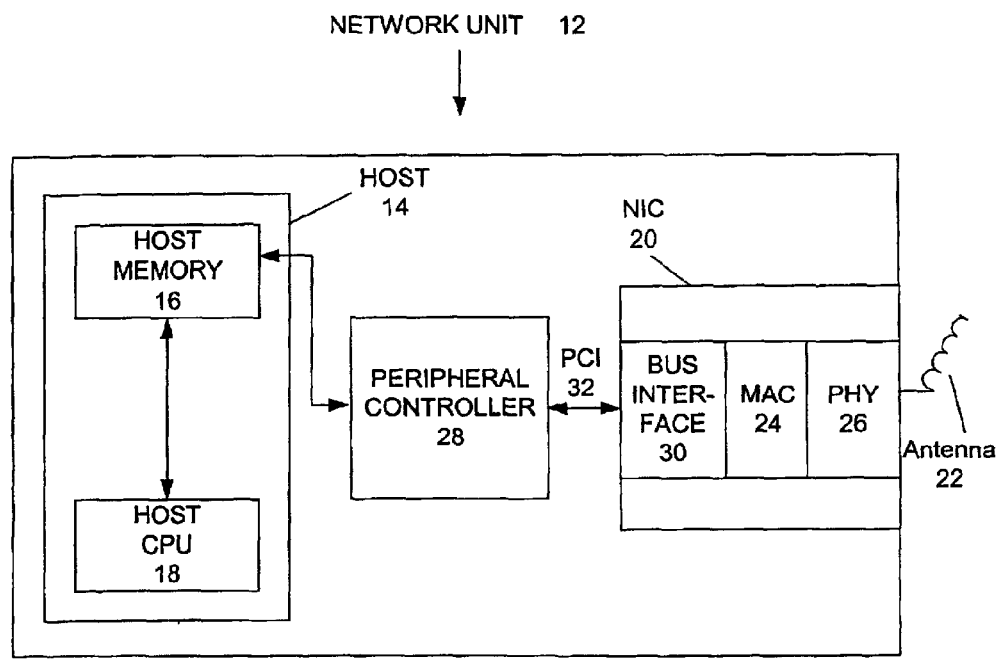
FIG. 1 is a diagram of an embodiment of a network unit according to the present invention.

An embodiment of a network unit 12 according to the present inventions is illustrated in FIG. 1. A host 14 includes a memory 16 and a CPU 18 that interact to carry out software functions. An NIC (Network Interface Card) 20 provides a hardware interface to the external network by means of an antenna 22. More generally, the functions of the NIC 20 can be carried out by a network interface unit. Hardware operations in the NIC 20 are carried out by the MAC (Media Access Control) 24, which connects to the antenna 22 through the PHY (physical layer) 26. A peripheral controller 28 mediates between software operations on the host 14 and hardware operations on the NIC 20. On the host side, the peripheral controller 28 accesses the host memory 16. On the NIC side, the peripheral controller 28 accesses a bus interface 30 through a PCI bus 32. The configuration shown in FIG. 1 is consistent with the ANSI/IEEE 802.11 Standard. ("Wireless LAN Medium Access Control (MAC) and Physical Layer (PHY) specifications", ISO/IEC 8802-11:1999(E))

In the network associated with the network unit 12, different types of frame data have varying priorities. Some data, known as Deadline Ordered (DO) data, must be moved as quickly as possible, while other data, known as Time Ordered (TO) data, must be sent at fixed intervals. That is, under nominal conditions the network unit 12 sends DO data; however, TO data must be sent at some TO time (TOT) after which the transmission of DO data may continue.

Figure 2A:
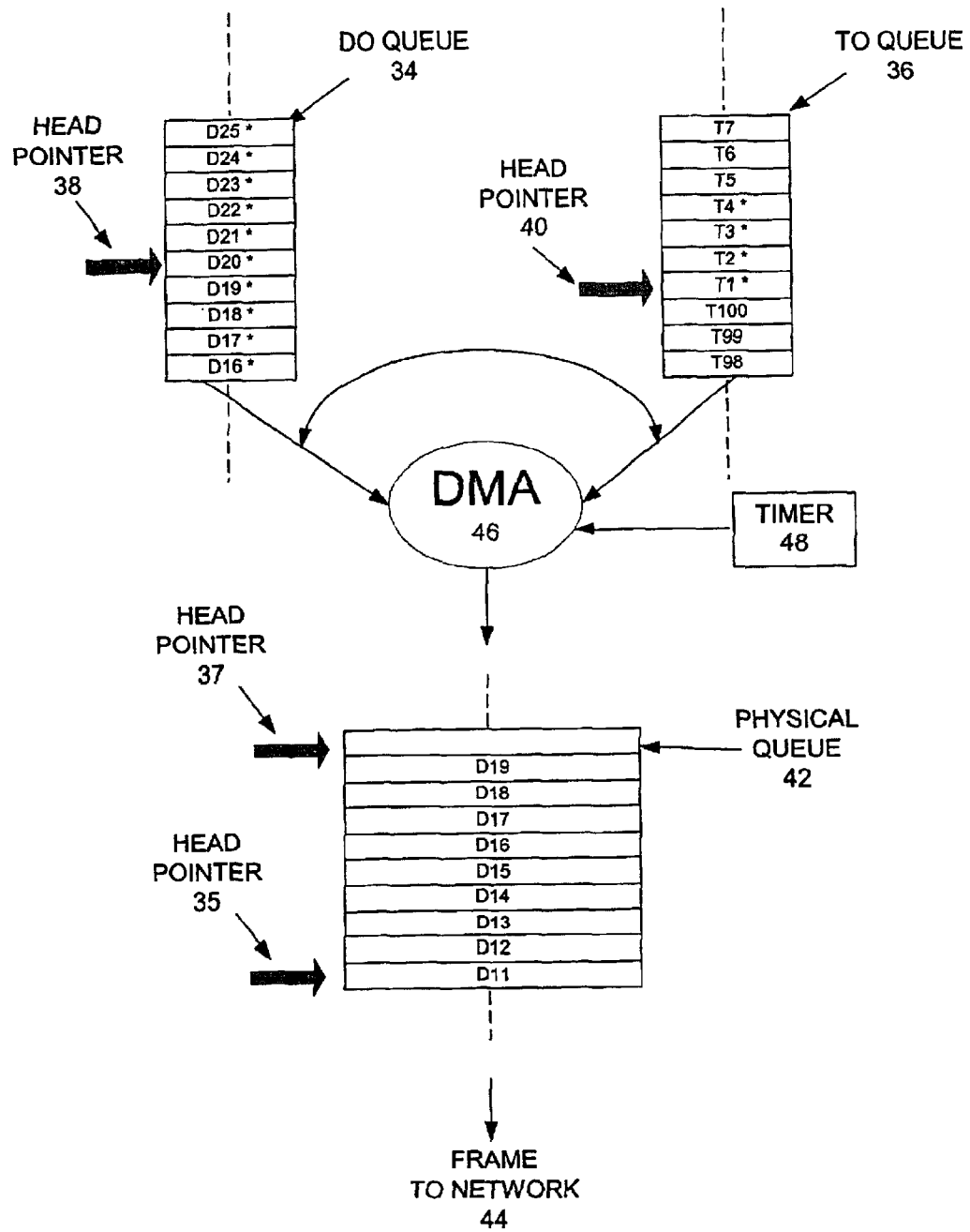
FIG. 2A shows a first stage of an example illustrating queue management for the embodiment shown in FIG. 1.
Figure 2B:
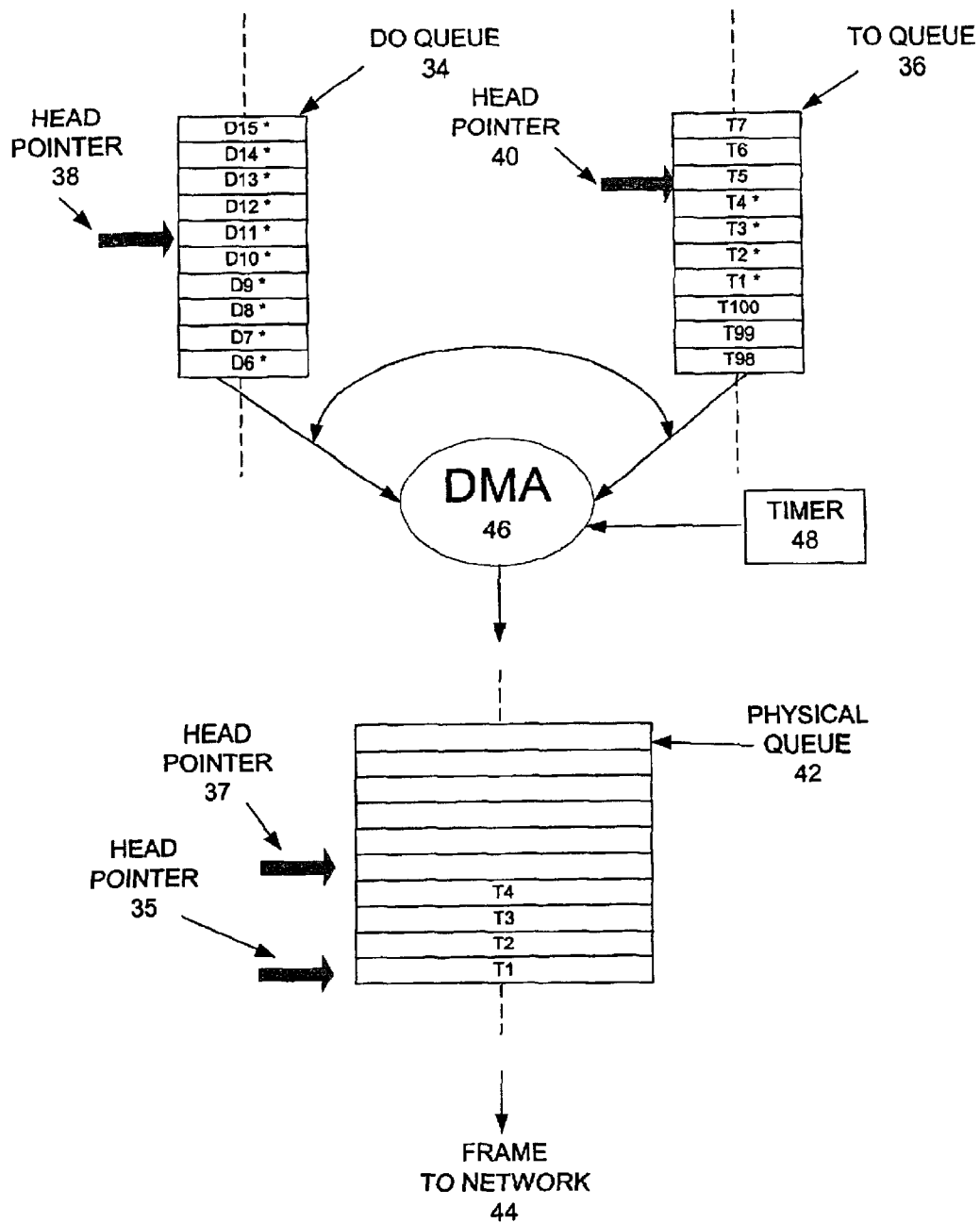
FIG. 2B shows a second stage of an example illustrating queue management for the embodiment shown in FIG. 1.
Figure 2C:
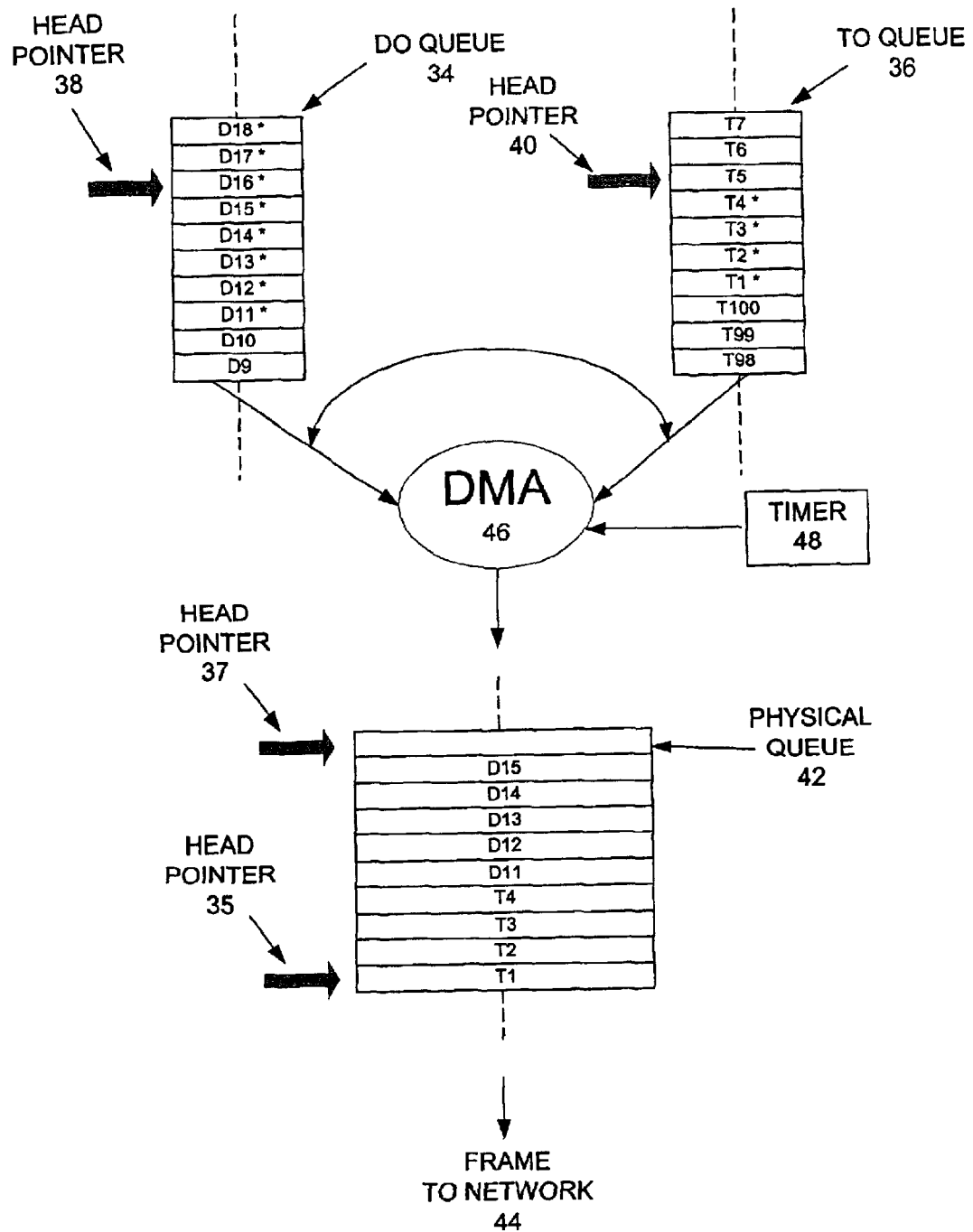
FIG. 2C shows a third stage of an example illustrating queue management for the embodiment shown in FIG. 1.

FIGS. 2A–2C show an example of queue management for the transmission of frames by the network unit of FIG. 1. FIG. 2A shows a DO queue 34 and a TO queue 36, which are maintained in software in the host memory 16, and a physical queue 42, which is maintained in hardware on the MAC 24. The host 14 manages data entry to the DO queue 34 and the TO queue 36, and the NIC 20 directly transmits data from the physical queue 42 to a network 44 through the antenna 22. A frame is said to be "completed" when it is transmitted to the network 44.

As a software component of the network unit 12, the host 14 maintains the DO queue 34 and the TO queue 36 and related addressing information in the host memory 16. Additionally, the host memory 16 maintains a status indicator that marks whether an entry in either of these queues contains a frame that has not yet been completed. An entry with a frame waiting to be completed is known as an active entry and is indicated by an asterisk ("*") in the figures. For example, in FIG. 2A the DO queue 34 contains active entries for at least D16–D25. Similarly, in FIG. 2A the TO queue 36 contains active entries for T1–T4. In FIG. 2A the TO queue 36 in represented as having 100 entries (i.e., T1–T100) although any size is possible. The queues 36, 38 may be stored as linked lists so that there is no limit to the number of entries although other data structures (e.g., a ring) may be used for queue storage. As shown in this example, active entries in the queues 34, 36 are contiguous.

As a hardware component of the network unit 12, the NIC 20 maintains the physical queue 42 in the MAC 24. The physical queue 42 receives frames that are read from the DO queue 34 and the TO queue 36 for transmission to the network 44. The MAC 24 manages the physical queue 42 by maintaining a head pointer 35 that points to an entry for the next frame to be completed and a head pointer 37 that points to the next available entry in the queue. The MAC 24 additionally maintains head pointers 38, 40 for the DO queue 34 and the TO queue 36 to indicate the next frames to be transferred to the physical queue 42.

For example, in FIG. 2A frame entries D11–D19 from the DO queue 34 are presently in the physical queue 42 for transmission to the network 44. The head pointer 38 of the DO queue 34 points to entry D20 because the frame stored here is the next frame that will be sent from the DO queue 34 to the physical queue 42. Similarly the head pointer 40 of the TO queue 36 points to entry T1, which is the next entry for transmission to the physical queue 42.

As shown in FIG. 2A, a direct memory access (DMA) engine 46 and a timer 48 are maintained in hardware on the MAC 24. By means of the DMA engine 46, the NIC 20 uses the peripheral controller 28 to accesses the host memory 16 and read frames from the DO queue 34 and the TO queue 36 to the physical queue 42. The MAC 24 monitors the timer 48 and keeps track of the times when the NIC 20 must switch from the DO queue 34 to the TO queue 36 (i.e., TOT). When making this switch, the MAC 24 flushes all frames from the physical queue 42 by adjusting the corresponding head pointers 35, 37 so that the physical queue 42 is effectively emptied. Additionally the MAC 24 restores the corresponding frames to the DO queue 34 and the TO queue 36 by backing up the corresponding head pointers 38, 40.

Then the NIC 20 reads all active entries in the TO queue 36 to the physical queue 42.

When all active entries of the TO queue 36 have been read to the physical queue 42, the NIC 20 again reads active entries from the DO queue 34 to the physical queue 42. Preferably, the MAC 24 additionally maintains a backup DO queue and a backup TO queue for storing addresses in host memory of frames that are flushed from the physical queue at TOT, thereby allowing faster access of these frames as they are again read into the physical queue 42.

Through the peripheral controller 28, the host 14 also monitors the passage of frames from the physical queue 42 to the network 44 whereby entries in the DO queue 34 and the TO queue 36 become available for reuse. By means of the status indicators (shown by a "*" in FIG. 2A), queue entries can be reused after a stored frame has been completed. When the status indicator shows that a queue is full, no additional data can be added to that queue without overwriting data.

FIG. 2B illustrates the queue states after TOT. In a period before TOT, the physical queue 42 is flushed and the DO header 38 is correspondingly restored. The time for this operation is called the flush time. In FIG. 2B, the head pointer 38 of the DO queue 40 has been reset to the D11 entry which was the next frame to be transmitted from the physical queue 42 to the network 44 in FIG. 2A. The flush time is nominally between 0.1 and 1.0 milliseconds depending on operational conditions.

At TOT the TO queue 36 is exhausted in the sense that all active entries in the TO queue are passed to the physical queue 42 and the head pointer 40 is correspondingly updated. The time for this transfer is called the TO-exhaust time, which is nominally about 75 microseconds. FIG. 2B shows that the active entries of the TO queue 36 (i.e., T1–T4) have been passed to the physical queue 42. The head pointer 40 of the TO queue 36 has been updated so that it points to the T5 entry.

After the TO queue has been exhausted, the NIC 20 switches access back to the DO queue 34 so that DO frames can be completed. FIG. 2C shows the physical queue 42 now containing DO frames D11–D15 behind the TO frames and the head pointer 38 of the DO queue 34 now updated to point to the D16 entry. Although not reflected in FIG. 2C, frames in the physical queue 42 are transmitted to the network 44 via the antenna 22, and the head pointer 35 that points to the next frame to be completed is correspondingly updated.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method of queue management comprising:
   adding entries having a first priority to a first software queue;
   adding entries having a second priority to a second software queue;
   reading entries from the first software queue to a physical queue;
   at a threshold time, flushing entries from the physical queue;
   after the act of flushing the physical queue, reading entries from the second software queue to the physical queue until a termination criterion is satisfied;
   after the termination criterion is satisfied, reading entries from the first software queue to the physical queue; and
   transmitting entries from the physical queue to a network.

2. A method as claimed in claim 1, further comprising:
   using a first head pointer in hardware to track a next entry of the first software queue to be read to the physical queue, the first head pointer including an address in the first software queue; and
   using a second head pointer in hardware to track a next entry of the second software queue to be read to the physical queue, the second head pointer including an address in the second software queue.

3. A method as claimed in claim 2, wherein the act of flushing the physical queue includes backing up the first head pointer and the second head pointer.

4. A method as claimed in claim 1, further comprising: monitoring a timer to determine the threshold time.

5. A method as claimed in claim 1, further comprising:
   using a head pointer in hardware to track a next entry of the physical queue for transmission to the network; and
   using a head pointer in hardware to track a next available entry of the physical queue for reading entries from the first software queue and the second software queue.

6. A method as claimed in claim 1, wherein
   the act of flushing the physical queue includes
      for entries in the physical queue having the first priority, storing addresses from
   the first software queue in a first backup buffer, and
      for entries in the physical queue having the second priority, storing addresses
   from the second software queue in a second backup buffer,
   the act of reading entries from the second software queue to the physical queue includes reading addresses in the second backup queue to access entries of the second software queue; and
   the act of reading entries from the first software queue to the physical queue after the termination criterion is satisfied includes reading addresses in the first backup queue to access entries of the first software queue.

7. A method as claimed in claim 6, further comprising:
   using a first head pointer in hardware to track a next entry of the first software queue to be read to the physical queue, the first head pointer including an address in the first software queue; and
   using a second head pointer in hardware to track a next entry of the second software queue to be read to the physical queue, the second head pointer including an address in the second software queue, wherein the act of flushing the physical queue includes backing up the first head pointer and the second head pointer.

8. A method as claimed in claim 1, wherein the termination criterion is satisfied when all active entries of the second software queue have been read to the physical queue.

9. A method as claimed in claim 1, wherein the entries include frame data.

10. A method as claimed in claim 1, further comprising:
    using status indicators for entries in the first software queue and the second software queue, an active status indicating that a corresponding entry is waiting to be transmitted to the network, and an inactive status indicating that a corresponding entry is not waiting to be transmitted to the network.

11. A method as claimed in claim 10, further comprising:
    switching a status indicator from active status to inactive status after transmitting a corresponding entry to the network.

12. A method as claimed in claim 11, wherein
    the act of adding entries to the first software queue includes switching corresponding status indicators from inactive status to active status, and
    the act of adding entries to the second software queue includes switching corresponding status indicators from inactive status to active status.

13. A method as claimed in claim 10, wherein the termination criterion is satisfied when all entries of the second software queue have an inactive status.

14. A method as claimed in claim 1, wherein the act of transmitting entries from the physical queue to the network includes transmitting wirelessly.

15. A system for transmitting data in a network, comprising:
    a host, the host including executable instructions in software for adding entries having a first priority to a first software queue that is maintained on the host and adding entries having a second priority to a second software queue that is maintained on the host;
    a network interface unit; and
    a peripheral controller connecting the host and the network interface unit and effecting a transmission link therebetween, wherein the network interface unit includes executable instructions in hardware for
    transmitting entries from a physical queue that is maintained on the network interface unit to a network;
    reading entries from the first software queue to the physical queue;
    at a threshold time, flushing the physical queue;
    after the act of flushing the physical queue, reading entries from the second software queue to the physical queue until a termination criterion is satisfied; and
    after the termination criterion is satisfied, reading entries from the first software queue to the physical queue.

16. A system as claimed in claim 15, wherein the network interface unit further comprises executable instructions in hardware for:
    using a first head pointer to track a next entry of the first software queue to be read to the physical queue, the first head pointer including an address in the first software queue; and
    using a second head pointer to track a next entry of the second software queue to be read to the physical queue, the second head pointer including an address in the second software queue.

17. A system as claimed in claim 16, wherein flushing the physical queue includes backing up the first head pointer and the second head pointer.

18. A system as claimed in claim 15, wherein the network interface unit further comprises:
   a timer; and
   executable instructions in hardware for monitoring the timer to determine the threshold time.

19. A system as claimed in claim 15, wherein the network interface unit further comprises executable instructions in hardware for:
   using a head pointer in hardware to track a next entry of the physical queue for transmission to the network; and
   using a head pointer in hardware to track a next available entry of the physical queue for reading entries from the first software queue and the second software queue.

20. A system as claimed in claim 15, wherein
   flushing the physical queue includes
      for entries in the physical queue having the first priority, storing addresses from
   the first software queue in a first backup buffer, and
      for entries in the physical queue having the second priority, storing addresses
   from the second software queue in a second backup buffer;
   reading entries from the second software queue to the physical queue includes reading addresses in the second backup queue to access entries of the second software queue; and
   reading entries from the first software queue to the physical queue after the termination criterion is satisfied includes reading addresses in the first backup queue to access entries of the first software queue.

21. A system as claimed in claim 20, wherein
   the network interface unit further comprises executable instructions in hardware for:
      using a first head pointer to track a next entry of the first software queue to be read to the physical queue, the first head pointer including an address in the first software queue; and
      using a second head pointer to track a next entry of the second software queue to be read to the physical queue, the second head pointer including an address in the second software queue; and
   flushing the physical queue includes backing up the first head pointer and the second head pointer.

22. A system as claimed in claim 15, wherein the termination criterion is satisfied when all active entries of the second software queue have been read to the physical queue.

23. A system as claimed in claim 15, wherein the entries include frame data.

24. A system as claimed in claim 15, wherein the host further comprises executable instructions in software for using status indicators for entries in the first software queue and the second software queue, an active status indicating that a corresponding entry is waiting to be transmitted to the network, and an inactive status indicating that a corresponding entry is not waiting to be transmitted to the network.

25. A system as claimed in claim 24, wherein the host further comprises executable instructions in software for switching a status indicator from active status to inactive status after a corresponding entry has been transmitted to the network.

26. A system as claimed in claim 25, wherein
   adding entries to the first software queue includes switching corresponding status indicators from inactive status to active status, and
   adding entries to the second software queue includes switching corresponding status indicators from inactive status to active status.

27. A system as claimed in claim 15, wherein transmitting entries from the physical queue that is maintained on the network interface unit to the network includes transmitting wirelessly.

28. A system for transmitting data in a network, comprising:
   means for maintaining a first software queue and a second software queue;
   means for adding entries having a first priority to the first software queue;
   means for adding entries having a second priority to the second software queue;
   means for maintaining a physical queue;
   means for transmitting entries from the physical queue to a network;
   means for reading entries from the first software queue to the physical queue;
   means for flushing the physical queue at a threshold time;
   means for reading entries from the second software queue to the physical queue, after flushing the physical queue until a termination criterion is satisfied; and
   means for reading entries from the first software queue to the physical queue after the termination criterion is satisfied.

29. A system as claimed in claim 28, further comprising:
   means for tracking a next entry of the first software queue to be read to the physical queue; and
   means for tracking a next entry of the second software queue to be read to the physical queue.

30. A system as claimed in claim 29, wherein the flushing means includes:
   means for backing up the next-entry tracking means for the first software queue; and
   means for backing up the next-entry tracking means for the second software queue.

31. A system as claimed in claim 28, wherein the network interface unit further comprises:
   means for timing; and
   means for monitoring the timing means to determine the threshold time.

32. A system as claimed in claim 28, further comprising:
   means for tracking a next entry of the physical queue for transmission to the network; and
   means for tracking a next available entry of the physical queue for reading entries from the first software queue and the second software queue.

33. A system as claimed in claim 28, wherein
   the flushing means includes
      for entries in the physical queue having the first priority, means for storing
   addresseses from the first software queue in a first backup buffer, and
      for entries in the physical queue having the second priority, means for storing
   addresses from the second software queue in a second backup buffer;
   the means for reading entries from the second software queue to the physical queue includes means for reading addresses in the second backup queue to access entries of the second software queue; and the means for reading entries from the first software queue to the physical queue after the termination criterion is satisfied includes means for reading addresses in the first backup queue to access entries of the first software queue.

34. A system as claimed in claim 33, further comprising:

means for tracking a next entry of the first software queue to be read to the physical queue; and means for tracking a next entry of the second software queue to be read to the physical queue, wherein the flushing means includes
   means for backing up the next-entry tracking means for the first software queue, and
   means for backing up the next-entry tracking means for the second software queue.

35. A system as claimed in claim 28, wherein the termination criterion is satisfied when all active entries of the second software queue have been read to the physical queue.

36. A system as claimed in claim 28, wherein the entries include frame data.

37. A system as claimed in claim 28, further comprising: means for indicating status for entries in the first software queue and the second software queue, an active status indicating that a corresponding entry is waiting to be transmitted to the network, and an inactive status indicating that a corresponding entry is not waiting to be transmitted to the network.

38. A system as claimed in claim 37, further comprising means for switching a status indicator from active status to inactive status after a corresponding entry has been transmitted to the network.

39. A system as claimed in claim 38, wherein means for adding entries to the first software queue includes means for switching corresponding status indicators from inactive status to active status, and means for adding entries to the second software queue includes means for switching corresponding status indicators from inactive status to active status.

40. A system as claimed in claim 28, wherein the means for transmitting entries from the physical queue to the network includes means for transmitting wirelessly.

* * * * *